United States Patent Office 2,747,128
Patented May 22, 1956

---

2,747,128

DIRECT CURRENT NEGATIVE CARBON ELECTRODE

John R. Whipple, Baton Rouge, La., assignor to Union Carbide and Carbon Corporation, a corporation of New York No Drawing. Application August 30, 1952, Serial No. 307,369

3 Claims. (Cl. 313—354)

The invention relates to a direct current carbon arc system of the type useful in providing a light source for motion picture projection, or for other purposes where light energy of high intrinsic brilliancy is desired, and is particularly concerned with an improved negative electrode for use in such system.

The conventional direct current arc system comprises a positive and negative carbon electrode arranged at an angle to each other, or co-axially, in arc relationship, and burning under conditions which provide a current density in the positive electrode sufficient to establish thereon a brilliant light source. The positive electrode usually has a relatively large core containing substantial amounts of rare earth metal compounds or other flame producing material for increasing the brilliancy of the luminous gases in a high intensity arc, or for otherwise modifying the arc characteristics. A core of relatively small diameter is also commonly employed in the negative electrode, in which there is usually incorporated an arc supporting material for the purpose of steadying the arc and centering its contact with this electrode. This core may also contain flame materials, if desired. The shell of both electrodes consists normally of a baked composition of substantially pure carbon containing no additive materials. There is a tendency under certain burning conditions, to form on the tip of the negative electrode a coating or layer of carbide derived from the flame material in the core of the positive electrode. This carbide deposit is definitely undesirable. It may cause the arc flame to wander erratically over the end of the negative electrode, producing a very unsteady light radiation. A heavy carbide layer may even prevent restriking of the arc when it is once interrupted. This phenomenon is especially prevalent in direct current arc systems employing a stationary positive electrode in a horizontal trim, and burning under comparatively low amperage with a short arc gap. Carbide formation under these conditions has been inhibited in the past by incorporation in the shell of the negative electrode of an alkali metal salt such as potassium sulfate but with the introduction of the Gretener "blown-arc" system described in United States Patent 2,540,256 issued February 6, 1951, the problem of "carbide-tipping" has again been raised, for the alkali metal salt expedient is ineffective to prevent carbide-tipping in this system.

It is the principal object of this invention to provide an improved negative electrode which is resistant to the formation of carbide on the tip while burning in the arc in the blown-arc system as well as in more conventional systems.

This object is achieved by the invention which is a negative electrode comprising a carbonaceous shell and a conventional core, the shell including by weight about 5% to 15% of an alkaline earth metal fluoride effective to prevent carbide formtaion on the tip of the electrode during use. The preferred fluoride is calcium fluoride. At least about 5% calcium fluoride must be present to achieve the desired objective, but it is unnecessary that the fluoride content exceed 15% by weight of the shell. A preferred proportion of fluoride is 5% to 10%.

The electrode of the invention is manufactured by conventional methods except that to the conventional carbonaceous mix used in making the shell is added the selected fluoride, most conveniently in solid, comminuted form.

A typical composition for the shell of an electrode embodying the invention contains 94.11% carbon flour and 5.89% calcium fluoride bonded by conventional tar or pitch binder. A core of standard formulation is provided in the electrode, and the shell is copper plated in conventional manner to aid in carrying the high current required for operation of a high intensity arc.

Tests of the electrode of the invention have shown it to be substantially free of carbide-tipping when used in conventional arc-lighting systems and to be substantially slower burning than prior anti-tipping electrodes, burning 5% to 10% slower for example than electrodes containing potassium sulfate. In the Gretener system above referred to the electrodes of the invention have proved to resist carbide tip formation completely.

What is claimed is:

1. In a cored negative electrode for a direct current carbon arc of the blown-arc type, a shell consisting of carbon and an alkaline earth metal fluoride uniformly dispersed therein, such fluoride constituting 5% to 15% by weight of said shell and inhibiting the formation of a carbide tip on said electrode.

2. In a cored negative electrode for a direct current carbon arc of the blown-arc type, a shell consisting of carbon and calcium fluoride uniformly dispersed therein, such fluoride constituting 5% to 15% by weight of said shell and inhibiting the formation of a carbide tip on said electrode.

3. In a cored negative electrode for a direct current arc of the blown arc-type, a shell consisting of carbon and calcium fluoride uniformly dispersed therein, such fluoride constituting 5% to 10% by weight of said shell and inhibiting the formation of a carbide tip on said electrode.

References Cited in the file of this patent

UNITED STATES PATENTS

| | | |
|---|---|---|
| 1,920,921 | Dorcas | Aug. 1, 1933 |
| 2,185,679 | Parisot | Jan. 2, 1940 |
| 2,282,533 | Simon et al. | May 12, 1942 |

FOREIGN PATENTS

| | | |
|---|---|---|
| 419,131 | Italy | Dec. 9, 1939 |